C. B. ROWE AND J. LAVERCOMBE.
HEADLIGHT ATTACHMENT FOR VEHICLES.
APPLICATION FILED DEC. 3, 1917.

1,347,409.

Patented July 20, 1920.
2 SHEETS—SHEET 1.

Inventors
Cecil B. Rowe and
James Lavercombe by Hubert Peck
Atty.

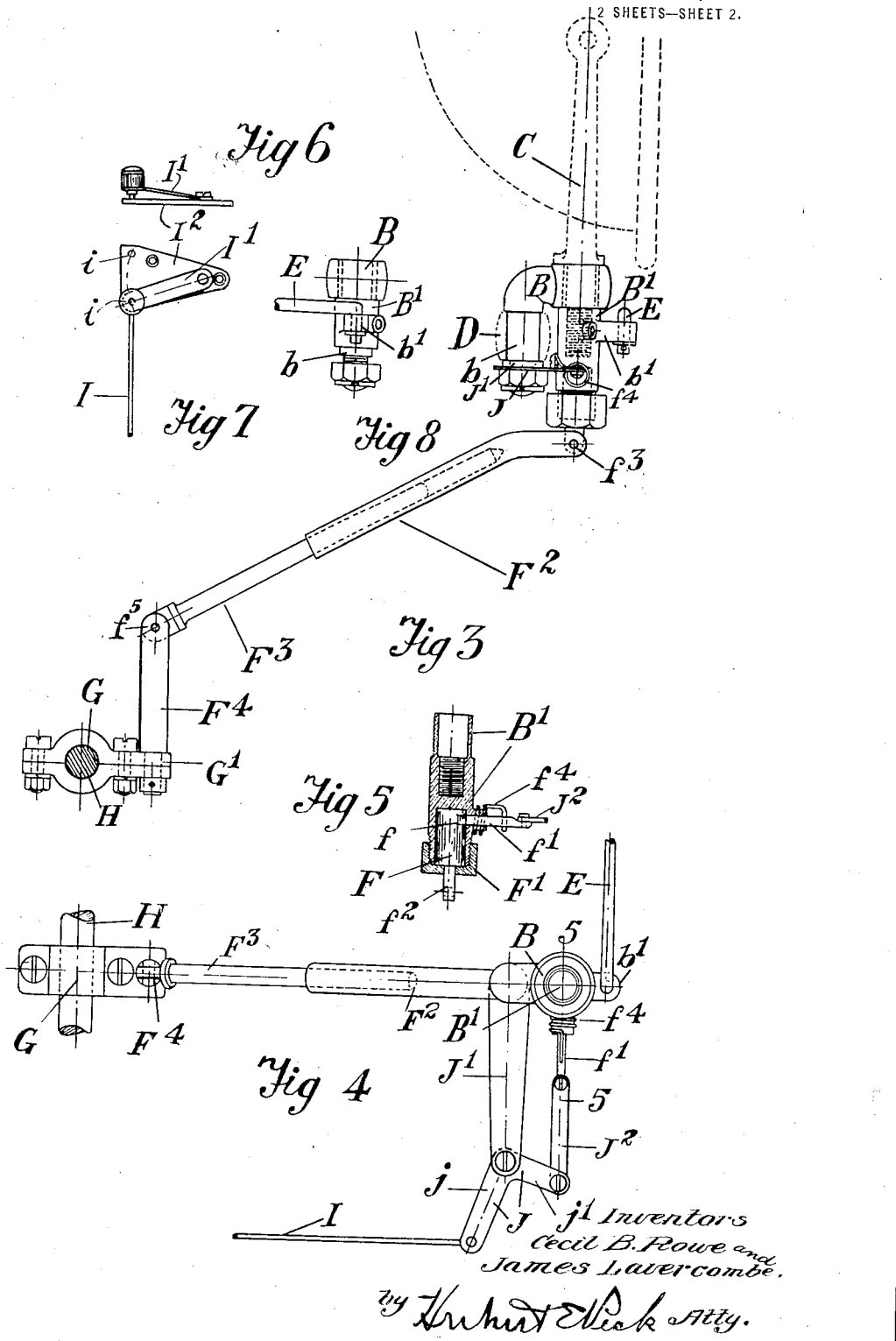

UNITED STATES PATENT OFFICE.

CECIL BLIGHT ROWE AND JAMES LAVERCOMBE, OF CASTLEMAINE, VICTORIA, AUSTRALIA.

HEADLIGHT ATTACHMENT FOR VEHICLES.

1,347,409.   Specification of Letters Patent.   Patented July 20, 1920.

Application filed December 3, 1917. Serial No. 205,168.

*To all whom it may concern:*

Be it known that we, CECIL BLIGHT ROWE and JAMES LAVERCOMBE, British subjects, and residents, respectively, of Hargraves street, Castlemaine, and Doveton street, Castlemaine, both in the State of Victoria, Commonwealth of Australia, have invented new and useful Improvements in Headlight Attachments for Vehicles, of which the following is a specification.

This invention of dirigible headlight attachment to motor cars and like vehicles has been designed to insure greater safety in night driving by providing means whereby the front lamps will be caused to partially rotate and so project their light forward in a direction parallel with the traveling planes of the front wheels when rounding curves or turning corners, thus enabling the driver to see and to avoid any person or obstacle which may be in the path or traveling course of the car or vehicle.

In furnishing a car or vehicle with our attachment we support in the usual standard lamp brackets, the pins or spigots of other eye brackets carrying lamp sockets to suit the type of lamp used, the two lamp sockets being connected by a transmission rod in order that both lamps will turn simultaneously in the same direction when operated by the means hereinafter described, from such as an arm on the radius rod of the front wheels steering gear, while also the oscillation or turning of the lamps can be controlled by one of said lamp sockets being connected to a two point control lever arranged on the dashboard of the vehicle and by which the lamps can instantly be made to be movable with the change in direction of the wheels or be allowed to remain stationary at their normal position.

The attachments may either be used with acetylene gas or electric lights, and further they can be fitted to a car of suitable build in about one hour.

The invention will now be fully described aided by a reference to the accompanying two sheets of drawings throughout which similar letters of reference will refer to corresponding parts.

Figure 1:
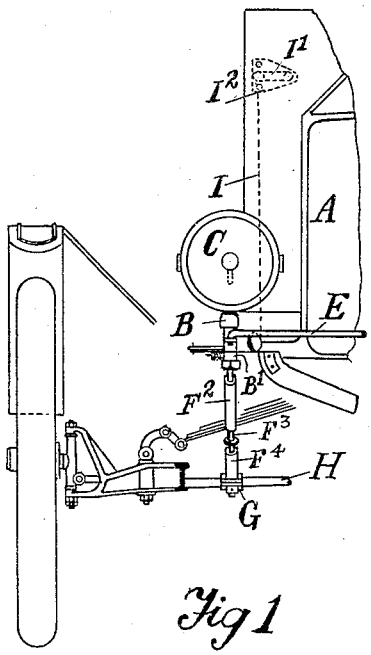

Figure 1 being a front view and

Figure 2:
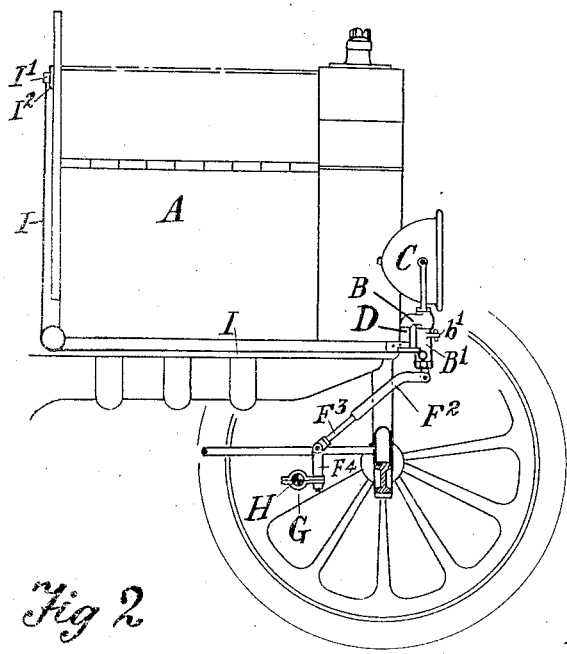

Fig. 2 a side view of as much of a motor car as is needful to illustrate the invention as attached to its forepart.

Fig. 3 is a side view and

Fig. 4 a plan of the main parts of the attachment by itself.

Fig. 5 a vertical central section taken on line 5—5 Fig. 4 and showing the lock box part of the attachment.

Fig. 6 a top view and

Fig. 7 a front view of the lever controller which is secured to the splash board and Fig. 8 a front view of the near side lamp socket.

In constructing and fitting our attachment on a motor car A or like vehicle we provide two eye brackets B—B (one for each side of the car) in each of which a socket $B^1$ is provided to carry the lamp or lamp holder C, the pins $b$ of said eye brackets B being made a fixture in the sockets of the standard lamp brackets D—D on the car chassis, while integral lugs $b^1$ at the front part of the lamp sockets $B^1$ are joined by a connecting rod E to cause the headlights to turn simultaneously in the same direction.

One of said lamp sockets $B^1$ has a short spindle F held in its lower part by a nut $F^1$ and provided with a transverse hole $f$ to receive a lock pin $f^1$, while the lower end of said spindle F has one half of a hinge joint $f^2$ on it to take into another half hinge joint $f^3$ formed at the upper end of a bent two part telescopic rod $F^2$—$F^3$, the central parts of which fit slidably one within the other, while again the lower end of part $F^3$ has a hinge joint connection $f^5$ with a vertical post $F^4$, the lower end of which is rotatably secured in a hole formed in a lug $G^1$ on a clamp arm G secured on the aforesaid radius rod H which connects the two front wheels steering gear together. The provision of a telescopic connection in the bent inclined and articulated rod $F^2$—$F^3$—$F^4$ between the aforesaid lower clamp arm $G^1$ and the lock spindle F in the socket $B^1$ which carries the lamp is to allow for the springing of the car. The lamp socket $B^1$ Fig. 8, which is arranged on the near side of the car is not provided with the short spindle F and its casing.

To enable the driver from his seat, to control the operative connection between the vehicle steering mechanism and the headlight turning or rotating means; a wire or flexible connection I is made between the two-point spring lever I¹ on the car dashboard and the bell crank J, said lever I¹ being centered on a plate I² having the two position holes $i$ in it to receive the pin of the spring lever, while said bell crank J is centered on a pin carried by a stationary arm J¹ supported about the pin of the eye bracket B on the original lamp socket D the bell crank having its one arm $j$ attached to the wire I and its other arm $j^1$ connected by a link J² to the pin $f^1$ which is drawn inwardly upon by the spring $f^4$ and which pin locks or unlocks the lamp socket B¹ and spindle F together, so that the lamps will remain stationary or lie at their normal position when the said spring controlled pin is withdrawn by the lever from the hole in spindle F when the latter will be free to partially rotate idly in the lower part of lamp socket, but when the pin is again freed by the said lever, it will pass to the hole in spindle F and cause it and so the lamp socket to follow the direction of the front wheels of car when turning street corners or curves for the purpose hereinbefore described.

What we claim and desire to secure by Letters Patent of the United States, is:—

1. In dirigible headlights for vehicles that embody steering mechanism, rotatable headlight supporting socket members connected together to rotate or turn in unison, a member-rotating connection between the steering mechanism and one of said socket members embodying a relatively freely movable spindle received in said socket member, a bolt projecting through said socket member, means yieldingly urging said bolt into engagement with said spindle to releasably lock said freely movable spindle to rotation with said socket member, and a manually controlled device operative from the driver's seat for withdrawing said bolt from engagement with said spindle against the action of said yielding urging means, said manually controlled device adapted to be secured with said bolt in either operative or inoperative position.

2. The combination with the headlights of an automobile, of lamp sockets, a spindle carried by one of the sockets, a locking member co-acting with the said socket and spindle, resilient means for normally pressing the locking member into position, a bell crank connected to the locking means, a rearwardly extending flexible member, and a two-point lever arranged on the dash board of the automobile and connected to the flexible member.

In testimony whereof we have signed our names to this specification in the presence of two subscribing witnesses.

CECIL BLIGHT ROWE.
JAMES LAVERCOMBE.

Witnesses:
BELLINGTON LAVERCOMBE,
LESLIE LAWTON BEAR.